United States Patent [19]

Murase

[11] 4,387,069
[45] Jun. 7, 1983

[54] METHOD OF MANUFACTURING POLYESTER FIBERS WITH GOOD ADHESION TO RUBBER

[75] Inventor: Shigemitsu Murase, Joyo, Japan

[73] Assignee: Unitika Limited, Kyoto, Japan

[21] Appl. No.: 317,668

[22] Filed: Nov. 2, 1981

[30] Foreign Application Priority Data

Nov. 19, 1980 [JP] Japan ................................. 55/163714

[51] Int. Cl.³ ...................... D01D 5/12; D01F 11/00;
D06M 1/00; C07C 143/02
[52] U.S. Cl. .................................. 264/210.3; 252/8.9;
260/503; 260/513 R; 260/512 R; 525/529
[58] Field of Search ...................... 264/210.3; 252/8.9;
525/529; 260/503, 512 R, 513 R

[56] References Cited

U.S. PATENT DOCUMENTS 3,793,425 2/1974 Arrowsmith ...................... 264/210.3
4,019,990 4/1977 Marshall et al. ................. 264/210.3
4,054,634 10/1977 Marshall et al. ................. 264/210.3
4,070,432 1/1978 Tamaddon ....................... 264/210.3
4,169,061 9/1979 Carver et al. ......................... 252/8.9
4,251,481 2/1981 Hamlyn ............................ 264/210.3
4,294,990 10/1981 Kleber et al. ......................... 252/8.9

Primary Examiner—H. S. Cockeram
Attorney, Agent, or Firm—Virginia S. Andrews

[57] ABSTRACT

This invention is a method of manufacturing polyester fibers with good adhesion to rubber, characterized in that in the process of spinning polyester fiber, a spinning oil (finish composition) containing an epoxy compound and the compound expressed by the general formula

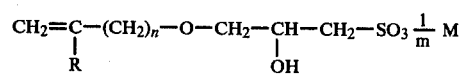

(where R is hydrogen, an alkyl group, a cycloalkyl group, or an aryl group; M is an alkali metal or an alkaline earth metal; n is an integer from 0 to 10; and m is 1 when M is an alkali metal and m is 2 when M is an alkaline earth metal) is added to the polyester fiber which is then heat treated.

17 Claims, No Drawings

METHOD OF MANUFACTURING POLYESTER FIBERS WITH GOOD ADHESION TO RUBBER

BACKGROUND OF THE INVENTION

This invention concerns a method of manufacturing polyester fibers with good adhesion to rubber, particularly by using a finish composition which contains an epoxy compound and the compound expressed by the general formula

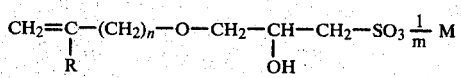

(where R is hydrogen, an alkyl group, a cycloalkyl group, or an aryl group; M is an alkali metal or an alkaline earth metal; n is an integer from 0 to 10; and m is 1 when M is an alkali metal and 2 when M is an alkaline earth metal), followed by heat treatment of the polyester fibers.

Polyester fibers, such as polyethylene terephthalate, have excellent physical and chemical properties, are mass produced industrially and are widely used in various fiels. They are also a very suitable material for reinforcing rubber.

However, polyester fibers have a great defect in that they are inferior in adhesion to rubber when compared to polyamide fibers such as nylon 6, nylon 6,6, etc., which are also typical industrial fibers.

Thus when polyamide fibers are simply treated with a resorcinol-formaldehyde-rubber latex (RFL) adhesive, they have good adhesion to rubber, but in the case of polyester fibers, even when this RFL treatment is performed, good adhesion cannot be obtained.

For this reason, many attempts have been made to improve the adhesion of polyester fibers to rubber. Typical methods for doing this are: (1) when treating the raw cord textile with the RFL treatment (the so-called "dipping treatment"), it is first pretreated with an adhesive such as an epoxy compound, an isocyanate compound, an ethylene urea compound, etc., and then treated with RFL or RFL mixed with an esterophilic ingredient such as a novolak resin, or 2,6-bis(2',4'-dihydroxyphenylmethyl)-4-chlorophenol, known by the trade name "Pexul"; and (2) an adhesive such as an epoxy compound, an isocyanate compound, etc., is added at the yarn stage, followed by dip-treating with RFL. Although the former method does give the desired adhesion to some degree, it has defects in that it requires a large quantity of adhesive, and the treatment method is troublesome, which tends to increase the cost. Although the latter method has the practical advantage that, like the polyamide fibers, the later dip treatment can be performed with RFL alone, it has the defect that the essential adhesive function is somewhat insufficient. Consequently, particularly in the latter method, a new problem is created that, in order to increase the adhesiveness, the method of treating the yarn itself must be performed under conditions which deviate greatly from the practical range; the concentration of the adhesive used in treating the yarn is markedly increased, the heat treatment conditions are made extremely severe, etc.

Various methods have been proposed in which a spinning oil (finish composition) containing an epoxy compound is added in the process of spinning the polyester fiber. However, when an epoxy compound is added to the spinning oil (finish composition), the emulsion stability of the oil is harmed, so that a large quantity of emulsifier is required; the emulsifier obstructs the adhesiveness of the fiber with the rubber, and good adhesion cannot be obtained.

SUMMARY OF THE INVENTION

Against such a background, this invention makes possible the manufacturing of polyester fibers with good adhesion to rubber by the very simple method of adding the adhesive at the same time the spinning oil (finish composition) is added, when the polyester fiber is spun, and then heat-treating by using the heat treatment of the subsequent drawing process, after which only RFL treatment is performed.

Thus this invention is characterized in that, in the process of spinning the polyester fiber, a spinning oil (finish composition) containing an epoxy compound and the compound expressed by the general formula

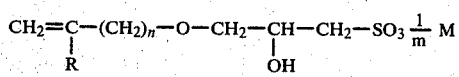

(where R is hydrogen, an alkyl group, a cycloalkyl group, or an aryl group; M is an alkali metal or an alkaline earth metal; n is an integer from 0 to 10; and m is 1 when M is an alkali metal and m is 2 when M is an alkaline earth metal) is added to the polyester fiber which is then heat treated.

In this invention, the compound expressed by the above general formula (abbreviated below as "vinyl compound") is a water dispersable compound. Besides aiding the emulsification of the epoxy compound with the oil, it increases rather than obstructs the adhesiveness of the fiber with the rubber.

The reason for this increase in adhesiveness is not clear, but it is thought to be due to a polymerization reaction of the vinyl compound occurring during the heat treatment.

Moreover, by using this invention, not only is a high initial adhesiveness obtained, but the permanent adhesion is also excellent, and even if the fiber is exposed to a high temperature in the rubber, the adhesion is not decreased greatly.

The epoxy compound in this invention is ordinarily synthesized by the reaction of an epoxy compound containing a halogen, e.g., epichlorohydrin, and a polyhydric alcohol or polyhydric phenol. Examples of such polyhydric alcohols or phenols are: polyhydric alcohols such as glycerol, ethylene glycol, diethylene glycol, propylene glycol, sorbitol, polyethylene glycol, polypropylene glycol, trimethylolpropane, or their derivatives; and polyhydric phenols such as recorcinol, catechol, hydroquinone, or their derivatives.

One may also use cyclohexane epoxide, diglycidyl ether, etc., obtained by oxidizing the unsaturated bonds with peracetic acid.

The vinyl compound in this invention is obtained by the reaction of a glycidyl ether compound, e.g., isopropenyl glycidyl ether, allyl glycidyl ether, vinyl glycidyl ether, cinnamyl glycidyl ether, propenyl glycidyl ether, pentinyl glycidyl ether, etc., with a sulfite or sulfate, e.g., sodium sulfite, potassium sulfite, magnesium sulfate, calcium sulfate, etc.

The spinning oil (finish composition) in this invention contains, besides the epoxy and vinyl compounds, natural oils such as mineral oil, coconut oil, rapeseed oil, sperm oil, etc., or synthetic oils such as esters of higher alcohols or polyhydric alcohols and higher fatty acids, as the lubricating ingredient. Furthermore, they may contain sufficient surfactant to emulsify and disperse this lubricating agent, as well as, if desired, antistatic agents, heat-resisting agents, reaction accelerators (curing catalysts), coloring agents, etc. There is not necessarily any need to use a surfactant as an emulsifying and dispersing agent, but in general it is desirable to use a compound of castor oil or a higher alcohol to which an alkylene oxide has been added, or polyethylene glycol, or an ester of polyethylene glycol and a higher fatty acid, etc. Of course, such a surfactant can also be the emulsifying and dispersing agent of the epoxy compound.

The proportion of the ingredients in the spinning oil should be 5–50 weight percent epoxy compound, 5–30 weight percent vinyl compound, 20–70 weight percent lubricating agent, 10–50 weight percent emulsifier, and suitable quantities of other ingredients to make a total of 100 weight percent.

If the proportions of the mixture are within these ranges, the original lubricating and adhering functions of the spinning oil (finish composition) will not be lost, and the increase in adhesion aimed for will be produced.

The "polyester" in this invention refers to a polycondensate of a compound with two ester-forming OH groups, typified by ethylene glycol, and a compound with two ester-forming carboxyl groups, typified by terephthalic acid; a typical example is polyethylene terephthalate. However, the polyester is not limited to homopolymers; copolymers are also possible, and compounds with three or more ester-forming groups may be used as copolymer ingredients, as long as they are within the range that will not hinder their fiber-forming ability.

The spinning process referred to is the process of spinning-winding-drawing-winding; of course, a spin-draw type of process, directly connecting the spinning and the drawing processes, may also be used. The spinning oil (finish composition) may be added at any desired stage of the operation by the roller, immersion, spray, or other methods. The spinning oil (finish composition) is used in the ordinary aqueous emulsion form, but it may also be used as a straight oil, diluted with low-viscosity mineral oil, etc., as long as dispersion and emulsification of the adhesive is possible. The addition of the oil (finish) may be performed two or more times; it is desirable for the total quantity of oil added to be 0.2–2 weight percent. Treatment with a spinning oil which lacks one or both of the epoxy and vinyl compounds may be combined with treatment with the spinning oil (finish composition) of this invention. After adding the oil, heat treatment is performed at 150°–250° C. for a period of 0.05 to several seconds. The method of heat treatment may be hot plate, hot rollers, slit heater, oven, etc. This heat treatment may correspond exactly to the drawing process, i.e., the heat treatment conditions of the drawing process will become the heat treatment conditions required by this invention, without change. Thus, this invention may be said to be extremely practical. The simplest application of the method of this invention is to use the yarn-forming oil (finish composition) of this invention itself as the spinning oil (spin finish), and then to perform the normal hot drawing treatment. Thus the composition of this invention has the great practical advantages that it can be applied as the spinning oil (spin finish) and that the severe heat treatment conditions of conventional methods are unnecessary.

Obviously the molecular weight, denier, filament number, cross-section shape, properties of the yarn material, fine structure, presence or absence of additives, and polymer properties (concentration of terminal carboxyl groups, etc.) are not limited in any way.

The polyester fibers obtained by the method of this invention will have extremely good adhesion to rubber merely upon application of the normal RFL treatment, after twisting and weaving by the normal methods.

This increase in adhesion does not stop with an improvement of the polyester fiber itself, but is also directly connected with an improvement in the quality of the rubber product which is being reinforced, and thus has great practical value.

DESCRIPTION OF THE PREFERRED EMBODIMENT

This invention will be explained concretely by the actual examples given below. The measurement of intrinsic viscosity in the actual examples was performed in a mixed solvent of phenol and tetrachloroethane (1/1 weight ratio), at 20° C.

The measurement of the adhesive force with the rubber was performed by the following method. The original yarn was made into raw cord (twisting, twining together) which was made into dip cord (dip treatment), embedded in the rubber, and vulcanized, after which the adhesion between the cord and the rubber was measured.

In this process, the raw cord was made by twisting with a ring twisting machine at 40 twists/10 cm; two of these cords were twined together in the same manner at 40 twists/10 cm.

The dip treatment was performed under the following conditions:

| Solution A | |
|---|---|
| Resorcinol | 15 parts |
| Formaldehyde | 20 parts |
| Caustic Soda | 0.4 parts |
| Water | 290 parts |
| Solution B | |
| Vinyl Pyridine-Butadiene-Latex Liquid (40%) | 240 parts |
| Butadiene-Styrene Latex (40%) | 80 parts |
| Water | 347 parts |

Solution A was cured at 25° C. for 6 hours; Solution B was cured at 25° C. for 4 hours. The two solutions were mixed, and again cured at 25° C. for 12 hours.

| Dipping Conditions | |
|---|---|
| Target Adhering Quantity (Solid Part) | 5 percent |
| Drying Zone | 80° C. × 30 seconds |
| Curing Zone (2 Chambers) | 230° C. × 80 seconds × 2 times |

The method of vulcanization was as follows: In an H-test mold, the dipped cord was embedded in unvulcanized rubber, the principal ingredients of which were: 30 parts smoked sheet, 70 parts styrene-butadiene rubber, 40 parts carbon black, 5 parts zinc oxide, 1.5 parts stearic acid, 1 part phenyl-beta-naphthyl amine, 0.3 part anhydrous phthalic acid, 0.8 part vulcanization accelerator, 0.15 part diphenyl guanidine, and 2 parts sulfur. The rubber was vulcanized by heating at 140° C. for 40 minutes, and the adhesive treatment was performed.

The method of measuring the adhesive force was the "H-test method"; the load required to pull out the cord embedded in rubber to a depth of 1 cm was measured.

ACTUAL EXAMPLE 1

Polyethylene terephthalate (PET) with an intrinsic viscosity of 0.95 was spun with an extruder-type melt spinner at a melting temperature of 290° C., a discharge quantity of 450 g/minute, and a winding speed of 450 m/minute. In doing so, the seven spinning oils shown in Table 1 were added, so that the quantity of active ingredients that adhered was 0.9 weight percent, and the yarn was wound.

Next, the yarn was drawn and heat-treated with a two-stage drawing machine composed of No. 1 rollers (100° C.), No. 2 rollers (100° C.), a hot plate (240° C.), No. 3 rollers (230° C.), and winding rollers. The time of passing over the hot plate was 0.2 second, the time of essential treatment by the No. 3 rollers 0.2 second, the total drawing ratio 6.0 fold, and the winding rate 200 m/minute. A PET fiber of 1500 denier/192 filaments was obtained.

When the yarn was made, Examples 1, 2 and 3 of this invention had good stability and lubrication, and the operation could be performed smoothly, but the other oils 4–7 were lacking in stability, and their spinnabilities were therefore not good.

The seven PET fibers obtained had the adhesiveness shown in Table 2.

As is clear from Table 2, Examples 1–3 of this invention show markedly higher adhesion then Comparative Examples 4–7. The difference in results between Comparative Example 4 and Example 1 of this invention shows especially clearly that this is caused by the presence or absence of a vinyl compound.

TABLE 1

|  | Number | | | | | | |
|---|---|---|---|---|---|---|---|
|  | 1 | 2 | 3 | 4 | 5 | 6 | 7 |
| Lubricants | | | | | | | |
| Isostearyl Oleate | 30 | 30 | 20 | 30 | 30 | 30 | 40 |
| Glycerine Oleate | | | 10 | | | 20 | 20 |
| Emulsifiers | | | | | | | |
| POE (20) Castor Oil | 10 | 5 | 20 | 20 | 20 | 10 | 20 |
| POE (10) Nonyl Phenol | 10 | 10 | | 15 | 10 | 15 | 10 |
| PEG (Molecular Weight 400) Monostearate | | | 5 | 5 | 5 | | 5 |
| Additives | | | | | | | |
| Epikote 812 | 30 | 30 | 20 | 30 | 30 | | |
| Sodium 3-Allyloxy-2-Hydroxypropane Sulfonate | 15 | 20 | 20 | | | 20 | |
| Other | | | | | | | |
| Na Dioctylsulfo-succinate | 5 | 4.7 | 5 | | 4.7 | 4.7 | 4.7 |
| m-Phenylene Diamine | | 0.3 | | | 0.3 | 0.3 | 0.3 |
| Total | 100 | 100 | 100 | 100 | 100 | 100 | 100 |

Notes
(1) Proportions expressed in weight percent. When added, these oils were used as 20 percent aqueous emulsions.
(2) POE means polyoxyethylation; the figures in parentheses are the numbers of moles added.
(3) Epikote 812 is a trade name of the Shell Chemical Company; it is an epoxy compound with a diglycidyl ether of glycerin as the principal ingredient.

TABLE 2

| Number | Adhesion (kg/cm) | Notes |
|---|---|---|
| 1 | 17.8 | Example of this invention |
| 2 | 17.5 | Example of this invention |
| 3 | 17.6 | Example of this invention |
| 4 | 13.4 | Comparative example |
| 5 | 13.6 | Comparative example |
| 6 | 9.5 | Comparative example |
| 7 | 8.4 | Comparative example |

ACTUAL EXAMPLE 2

The spinning oils (finish compositions) shown in Table 3 were used in making PET fiber by the same method as in Actual Example 1. The results of adhesion testing are also shown in Table 3.

As is clear from Table 3, the examples of this invention, 8–11, have higher adhesion than Comparative Examples 12 and 13. Furthermore, the examples of this invention are better than the comparative examples in the case of spinning performance.

TABLE 3

|  | Number | | | | | |
|---|---|---|---|---|---|---|
|  | 8 | 9 | 10 | 11 | 12 | 13 |
| Mineral Oil | 30 | | | 10 | 30 | |
| Coconut Oil | | 30 | | 20 | | 5 |
| Rapeseed Oil | | | 30 | | 5 | 30 |
| POE (15) Hardened Castor Oil | 5 | 5 | 5 | 5 | 15 | 10 |
| POE (20) Lauryl Phenol | 5 | 5 | 5 | 15 | 10 | 15 |
| PEG (Molecular Weight 600) Dioleate | 5 | 5 | 5 | 5 | 5 | 5 |
| Denacol EX-421 | 30 | 20 | 25 | 30 | 30 | |
| Potassium 3-Allyloxy-2-Hydroxypropane Sulfonate | 20 | 30 | 25 | 10 | | 30 |
| Na Dioctyl-sulfosuccinate | 4.7 | 4.7 | 4.7 | 4.7 | 4.7 | 4.7 |
| m-Phenylene Diamine | 0.3 | 0.3 | 0.3 | 0.3 | 0.3 | 0.3 |
| Total | 100 | 100 | 100 | 100 | 100 | 100 |
| Adhesion (kg/cm) | 17.6 | 17.5 | 17.7 | 17.9 | 13.5 | 9.7 |

Note:
Denacol EX-421 is a trade name of the Nagase and Company Ltd.; it is an epoxy compound, the principal ingredient of which is the triglycidyl ether of diglycerine.

ACTUAL EXAMPLE 3

A PET spun yarn with an intrinsic viscosity of 0.90 was fed, without winding, into a spin draw apparatus made up of No. 1 rollers (separating rollers attached), No. 2 rollers (Nelson rollers, 150° C.), No. 3 rollers (Nelson rollers, 200° C.), No. 4 rollers (Nelson rollers, 210° C.), and No. 5 rollers (separating rollers attached, 230° C.); drawn in two stages a total of 6.0 fold; and finally wound at a rate of 1000 m/minute, making a 1500 denier/192 filament PET fiber. During this process, 0.5 weight percent straight oil, composed principally of low viscosity mineral oil, coconut oil, etc., was added. Furthermore, between the No. 4 and No. 5 rollers, 1.0 weight percent each of oils Numbers 2 and 5 of Actual Example 1 were added, and heat treatment was performed for 1 second with the No. 5 rollers. The adhesion values of the fibers obtained were 16.5 kg/cm with the No. 2 oil and 13.4 kg/cm with the No. 5 oil. The superiority of the former, an example of this invention, was evident.

I claim:

1. A finish composition for polyester fiber to improve adhesion to rubber comprising a lubricant and
   (a) about 5 to 50 weight percent of an epoxy compound, and
   (b) about 5 to 30 weight percent of a compound expressed by the general formula $$CH_2=C-(CH_2)_n-O-CH_2-CH-CH_2-SO_3\frac{1}{m}M$$
$$\phantom{CH_2=}|\phantom{-(CH_2)_n-O-CH_2-}|$$
$$\phantom{CH_2=}R\phantom{-(CH_2)_n-O-CH_2-}OH$$

where R is hydrogen, an alkyl group, a cycloalkyl group, or an aryl group; M is an alkali metal or an alkaline earth metal; n is an integer from 0 to 10; m is 1 when M is an alkali metal and m is 2 when M is an alkaline earth metal.

2. The composition of claim 1 wherein the lubricant is present in an amount of 20 to 70 weight percent.

3. The composition of claim 1 additionally comprising a surfactant.

4. The composition of claim 3 wherein the lubricant is present in an amount of 20 to 70 weight percent and the surfactant is present in an amount of 10 to 50 weight percent.

5. The composition of claim 4 wherein the epoxy compound is synthesized by the reaction of an epoxy compound containing a halogen with an alcohol or phenol.

6. The composition of claim 5 wherein the epoxy compound containing a halogen is epichlorohydrin.

7. The composition of claim 4 wherein the epoxy compound is selected from the group consisting of compounds having a double bond oxidized with peracetic acid, the reaction product of epichlorohydrin with a polyhydric alcohol, and the reaction product of epichlorohydrin with a polyhydric phenol.

8. The composition of claim 4 wherein the compound expressed by the general formula is the reaction product of a glycidyl ether compound with a sulfite or sulfate.

9. The composition of claim 4 wherein the compound expressed by the general formula is sodium 3-allyloxy-2-hydroxypropane sulfonate.

10. The composition of claim 4 wherein the compound expressed by the general formula is potassium 3-allyloxy-2-hydroxypropane sulfonate.

11. A method of producing polyester fiber with improved adhesion to rubber comprising
   (i) applying to the fiber a finish composition comprising a lubricant and
      (a) about 5 to 50 weight percent of an epoxy compound, and
      (b) about 5 to 30 weight percent of a compound expressed by the general formula $$CH_2=C-(CH_2)_n-O-CH_2-CH-CH_2-SO_3\frac{1}{m}M$$
$$\phantom{CH_2=}|\phantom{-(CH_2)_n-O-CH_2-}|$$
$$\phantom{CH_2=}R\phantom{-(CH_2)_n-O-CH_2-}OH$$

where R is hydrogen, an alkyl group, a cycloalkyl group, or an aryl group; M is an alkali metal or an alkaline earth metal; n is an integer from 0 to 10; m is 1 when M is an alkali metal and m is 2 when M is an alkaline earth metal, followed by
   (ii) heating the fiber at a temperature of about 150° to 250° C. for up to several seconds.

12. The method of claim 11 wherein the heating is for 0.05 up to several seconds.

13. The method of claim 12 wherein the heating is for 0.2 to 1 second.

14. The method of claim 11 wherein the finish composition is applied during spinning of the fiber.

15. The method of claim 11 wherein the finish composition is applied after the fiber has been drawn.

16. The method of claim 11 wherein about 0.2 to 2 percent, based on the weight of the fiber, of the finish composition is applied.

17. The method of claim 11 wherein the finish composition additionally comprises a surfactant which is present in an amount of 10 to 50 weight percent, and wherein the lubricant is present in an amount of 20 to 70 weight percent.

* * * * *